United States Patent [19]
Lindstrom

[11] Patent Number: 5,438,521
[45] Date of Patent: Aug. 1, 1995

[54] APPARATUS AND METHOD FOR MEASURING AND COMPENSATING THE LENGTH OF A PUNCH TOOL

[75] Inventor: Mikko Lindstrom, Streamwood, Ill.

[73] Assignee: Finn-Power International, Inc., Schaumburg, Ill.

[21] Appl. No.: 208,217

[22] Filed: Mar. 10, 1994

[51] Int. Cl.6 .................. G05B 19/18; G06F 17/00
[52] U.S. Cl. ................. 364/474.17; 364/474.02
[58] Field of Search .............. 364/474.16–474.18, 364/474.02; 83/76.8, 76.9, 203, 277, 916, 34, 49; 72/21, 389; 100/53

[56] References Cited

U.S. PATENT DOCUMENTS

| | | | |
|---|---|---|---|
| 4,272,812 | 6/1981 | Svensson | 83/76.8 |
| 4,382,215 | 5/1983 | Barlow et al. | 364/474.18 |
| 4,489,578 | 12/1984 | Nagai et al. | 72/21 |
| 4,590,580 | 5/1986 | Takezawa et al. | 364/474.18 |
| 4,704,693 | 11/1987 | Thomas | 364/474.18 |
| 4,899,094 | 2/1990 | Pilborough | 364/474.18 |
| 4,916,990 | 4/1990 | Dolansky et al. | 83/34 |
| 4,974,165 | 11/1990 | Locke et al. | 364/474.18 |
| 5,011,345 | 4/1991 | Nishigai et al. | 364/474.18 |
| 5,136,521 | 8/1992 | Van Daalen et al. | 364/474.02 |

*Primary Examiner*—James P. Trammell
*Attorney, Agent, or Firm*—Pollock, Vande Sande & Priddy

[57] ABSTRACT

To eliminate the need for manually measuring the length of a punch to provide compensation for any shortening of its length in a punch press, a sensor probe is provided at a predetermined height from the punch so that as the punch is driven by its driving ram, it makes contact with the probe. As soon as contact is made between the punch and the probe, the movement of the ram is stopped and its relative position is recorded and compared with a theoretical ram start position for driving, for example, a brand new punch. The difference between the theoretical ram start position and the thus measured position is provided as an offset to reposition the ram so that the wear of the punch is compensated.

13 Claims, 3 Drawing Sheets

APPARATUS AND METHOD FOR MEASURING AND COMPENSATING THE LENGTH OF A PUNCH TOOL

FIELD OF THE INVENTION

The present invention relates to numerically controlled punch presses or turret punch presses, and particularly relates to an apparatus and method for compensating the wear and tear of a punch tool so that, irrespective of its length, the punch tool could nonetheless be driven to penetrate a worksheet placed on a worktable.

BACKGROUND OF THE INVENTION

In a punch press, in order to punch a hole in a worksheet successfully, the punch tool (punch) has to be pressed below the top surface of its corresponding die. However, wear and tear sets in when the punch has been used many times. Whereupon tile punch becomes dull and the holes made thereby on the worksheet become unacceptable. The punch then has to be sharpened.

Ordinarily, the same type of punches, as originally manufactured, tend to have the same predetermined length. However, in the typical shop environment, an operator has no guidelines on how much to grind a worn punch in order to sharpen the same. In other words, albeit it is known that the length of the punch will be shortened, there is no guarantee that every worn punch, once sharpened, would have the same length. Accordingly, prior to the instant invention, the operator has to carefully measure the length of the sharpened punch and provide the required offset to the ram to drive the punch. In the case of a numerically controlled punch press, this means manually inputting the new measured length of the punch and the required offset for the ram. Needless to say, such manual input adds additional steps, and therefore additional unproductive time, to the operation of a punch press. Furthermore, for a turret punch press having a multiple number of punches, the measurement of the respective lengths of the punches and the inputting of data to the computer become multifold.

BRIEF DESCRIPTION OF THE PRESENT INVENTION

To overcome the aforementioned disadvantages, a touch probe is provided relative to the punch and die of a punch press in the instant invention. The touch probe is pivotable or movable to at least two positions—a first position in which it is located along the line of movement of the punch, and a second position away from the path of the punch. To measure the required offset, the probe is pivoted to the first position. Thereafter the ram is moved to drive the punch at a slow rate until the tip of the punch comes into contact with the sensor of the probe. At which time a signal is provided by the probe to the control processor of the punch press to stop the ram motion. At the same time, the CNC processor reads the ram position and compares the same with a theoretical ram position to establish an offset from the difference between the two positions. The theoretical ram position is, of course, dependent on the length of a new punch, while the actual ram position represents the amount of distance the ram has to travel to drive the used punch to the sensor position, i.e., a predetermined location. Having thus obtained the offset, the ram is thereafter moved a distance represented by its theoretical ram position plus the offset to drive the punch to mate with the die, to thereby punch holes in the workpiece.

Since there is no need for an operator to manually measure the length of the punch, a substantial amount of time is saved. Furthermore, there is no potential for human errors in terms of measuring the length of the punch or inputting the data to the controller.

An objective of the present invention is therefore to automatically compensate for the wear of a punch.

Another objective of the present invention is to eliminate the amount of time required to provide an offset for a punch whose length is shorter than when new.

BRIEF DESCRIPTION OF THE FIGURES

The above mentioned objectives and advantages of the present invention will become more apparent and the invention itself will be best understood by reference to the following description of an embodiment of the invention taken in conjunction with the accompanying drawings, wherein.

DETAILED DESCRIPTION OF THE PRESENT INVENTION

Figure 1:
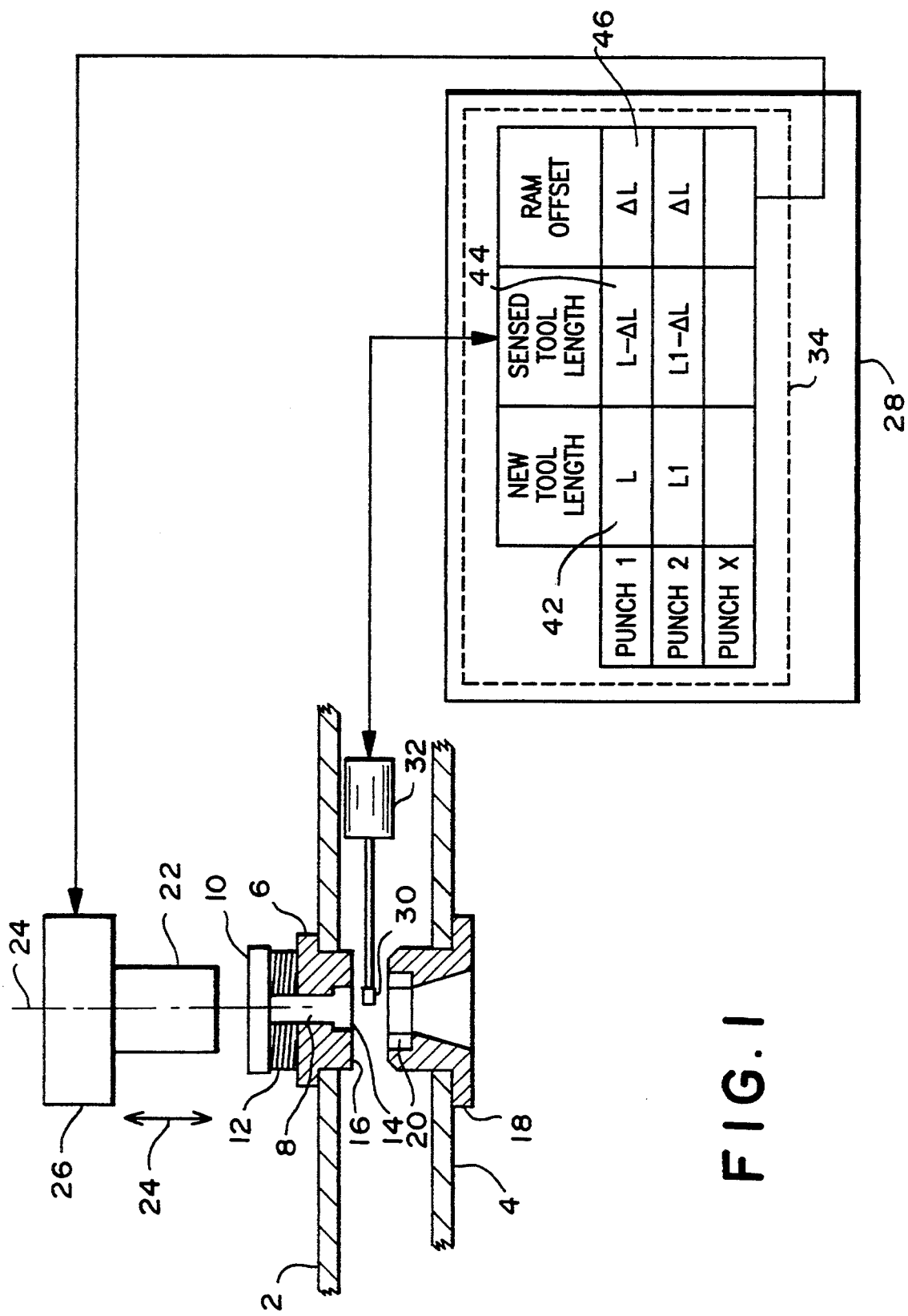
FIG. 1 is a cross-sectional view of the present invention.

With reference to FIG. 1, there is shown in cross-sectional view a numerically controlled turret punch press such as that in the Finn-Power FMM series machine centers. For the instant invention, for the sake of clarity, only relevant portions of the punch press are shown.

As shown, the turret punch press has an upper turret plate 2 and a lower turret plate 4. Mounted to the upper and lower turret plates are a plurality of punches and dies, respectively, of which only one set is shown. As illustrated, mounted to upper turret plate 2 is a punch holder 6 to which is inserted a punch 8. Punch 8 is coupled to a head 10, which is biased upwardly by a spring 12 such that the work end, or tip, 14 of punch 8 ordinarily does not extend beyond the underside 16 of punch holder 6. Facing tool holder 6 and mounted to lower turret plate 4 is a die holder 18 having fitted thereto a die 20, which is dimensioned to fittingly mate with tip 14 of punch 8.

As is well known, to drive punch 8 to mate with die 20, a driver such as ram 22, which is aligned along a longitudinal axis 24 with punch 8 and die 20, is used. Ram 20 in turn is driven longitudinally per arrows 24 by a moving means such as a hydraulic drive mechanism 26. As shown, hydraulic drive 26, and therefore the movement of ram 22, is controlled by a processor means, such as central controller 28, of the machine center.

Also shown in FIG. 1 is a probe sensor means, represented by probe head 30, positioned relative to punch 8 and die 20. Sensor probe 30 may be a conventional touch probe made by the Renishaw Company. For the instant embodiment, probe 30 is pivotally mounted to a conventional motor, as for example a stepping motor 32, which in turn may be mounted to the frame of the turret punch press. With appropriate cams and gears, probe 30 is pivotable or movable to the predetermined position shown in FIG. 1 in which it is positioned in the line of movement of punch 8, and to at least a second position where it is completely removed from the line of movement of punch 8 so that it does not obstruct the travel of punch 8 to die 20. The control of the movement of motor 32, and therefore the pivoting of probe 30, is by controller 28.

When in the predetermined position shown in FIG. 1, when probe 30 is contacted by tip 14 of die 8, a signal is provided by probe 30, which converts the mechanical contact to an electrical impulse, to controller 28. In particular, this signal is fed to a table in a memory portion 34 of processor 28. The relevancy of the table in memory 34 is discussed with reference to FIGS. 2A and 2B.

Figure 2B:
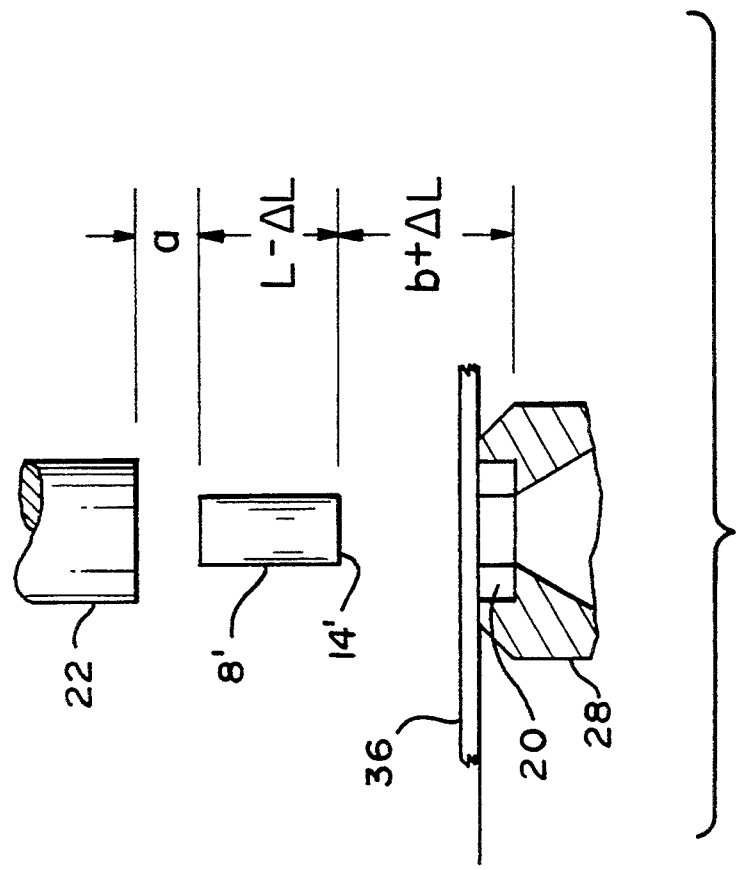
FIGS. 2A and 2B are simplified drawings for illustrating the relationship between the punch, the ram and the die of the present invention.
Figure 2A:
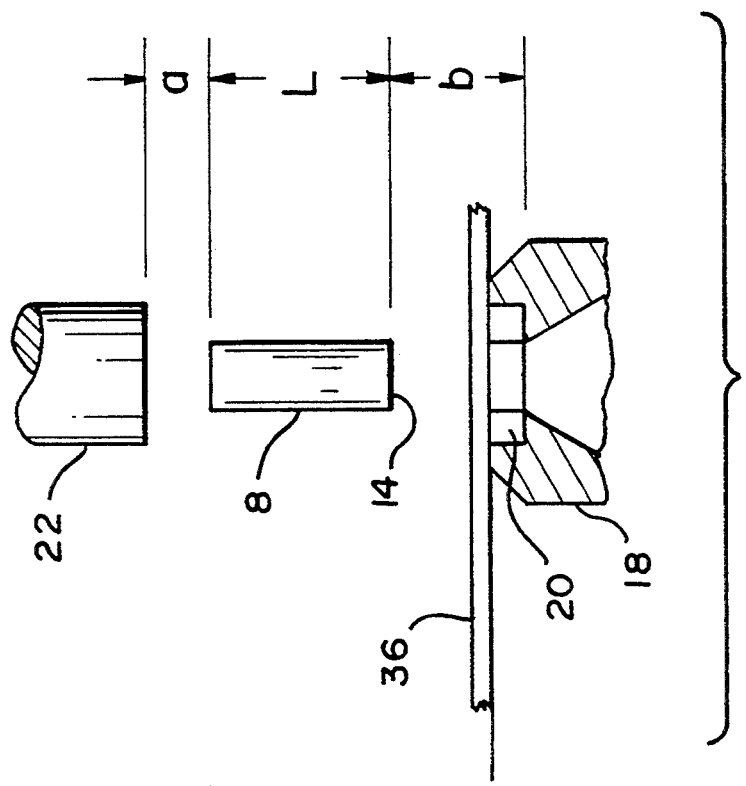

FIG. 2A is a simplified drawing showing a new punch 8 having a length L. As shown, the distance separating the top of punch 8 and the impact portion of ram 22 is "a", while the distance separating tip 14 of punch 8 and the bottom portion of die 20 is "b". Thus, in order to form a hole in worksheet 36, ram 22 has to be moved a distance of a+b so that tip 14 of punch 8 would penetrate through worksheet 36 into die 20. The distance a+b which ram 22 has to move is known, given that length L of a new punch 8 is a standard length generally provided by the manufacturer of the punch. Length L is shown in box 42 of the table in memory 34 of central processor 28. The position of ram 24, for the FIG. 2A embodiment, can be thought of as a theoretical ram start position, since it is the position to locate the ram to drive a new punch.

After a punch has been used numerous times, it becomes worn and dull. The quality of holes, if any, formed from a worn tool is likely to be unacceptable. Accordingly, the worn punch is removed and sharpened. However, to sharpen a worn tool necessarily requires grinding, and therefore shortening, of the same. And the amount of reduction of the length of each tool can vary. Thus, as shown in FIG. 2B, a shortened tool 8' has a length of $L-\Delta L$. For the FIG. 2B illustration, given the same distance "a" separating the impact portion of ram 22 and the top of punch 8' means that the distance separating tip 14' of punch 8' and the bottom of die 20 is now $b+\Delta L$. Thus, for the FIG. 2B illustration, in order to ensure punch 8' would mate with die 20, ram 22 now has to be moved a distance $a+b+\Delta L$. Alternatively, instead of positioning ram 22 at the same height as that shown in FIG. 2A, ram 22 for the FIG. 2B illustration can be lowered (or offset) a distance $\Delta L$ so that the distance separating the impact portion of ram 22 and the top portion of punch 8' becomes $a-\Delta L$. The repositioning or offsetting of ram 22 for the FIG. 2B illustration is desirable insofar as it maintains the stroke of ram 22 for the FIG. 2B illustration to be the same as that of FIG. 2A.

As was mentioned previously, the length of sharpened punch 8' can of course be manually measured and the offset of ram 22 manually computed. But as was also mentioned, such manual operations take up precious time. The instant invention eliminates such manual operations. Specifically, with reference to FIG. 1, after a sharpened punch 8 has been returned to its punch holder 6 and probe 30 pivoted or moved to the shown location, to determine the offset $\Delta L$, ram 22 is moved downwards slowly to drive punch 8 until tip 14 comes into contact with probe 30. The signal generated by probe 30 is then sent to the table in memory 34 to establish the position at which ram 22 has to be moved in order to have tip 14 of punch 8 reach the predetermined position, represented by probe 30. The correlated sensed tool length is then placed in box 44 of the table in memory 34. The ram offset $\Delta L$, which is the difference between the length of a new punch and that of the sharpened or used punch, is stored in a further column of the table such as box 46. Once the offset $\Delta L$ is determined, ram 22 is offset the same amount $\Delta L$ to ensure that tool 8 would fittingly mate with die 20 to properly penetrate worksheet 36.

Figure 3:
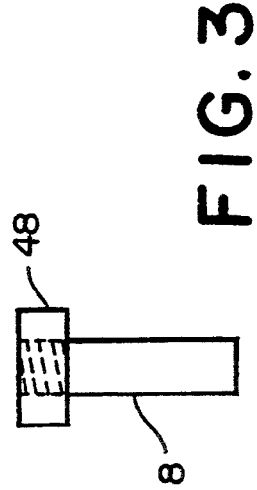
FIG. 3 is a cross-sectional view of a punch having coupled thereto an adjustment screw.

In the instance that a brand new punch tool is manufactured by a manufacturer to have a different length than the theoretical length already input to the table of memory 34, an adjustment screw 48 may be threaded to the top portion of punch 8 to lengthen the same to the preestablished length. Alternatively, instead of adding adjustment screw 48 per FIG. 3, the new punch 8 may be directly inserted to punch holder 6. The same process discussed in the previous paragraph can be performed to provide an offset for the theoretical length of new punch 8. The length of this newly measured punch could then be input to box 42 of the table in memory 34. Of course, the operation to determine the length of the tool after it has been used many times and sharpened is the same as was discussed.

Figure 4:
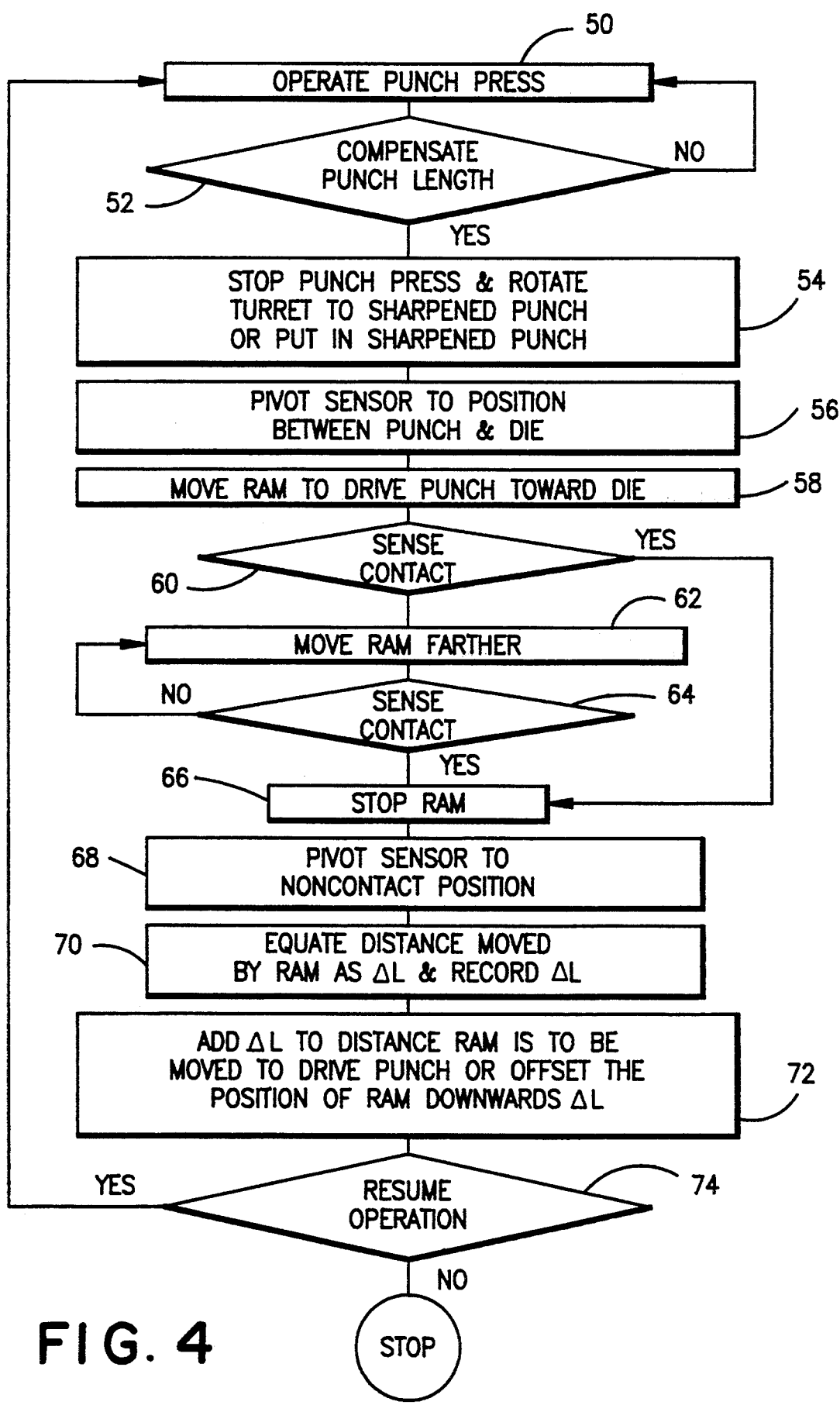
FIG. 4 is a flow chart illustrating the operation of the instant invention.

FIG. 4 is a flow chart illustrating the operational steps of the instant invention. In particular, the punch press is presumed to be operational in block 50. Whether or not the punch length needs to be compensated, i.e., the movement of ram 22 needs to be offset, is queried in block 52. If there is no need to compensate for the length of the punch, then punch press continues to operate as operation passes from block 52 to 50. The length of the punch is continuously monitored, as for example by the process discussed in co-pending application Ser. No. 773,317 filed Oct. 10, 1991 by the same inventor and assigned to the same assignee as the instant invention. When it is determined that the punch is too dull, it is replaced, either by rotating the turret to a sharpened punch or take out the dull punch and replace the same with a sharpened punch. This step is performed in block 54. Thereafter, probe 30 is pivoted by motor 32, from command from processor 28, to the predetermined position illustrated in FIG. 1 per block 56. Ram 22 is then moved downwards along axis 24 to press punch 8 toward die 20, and presumably towards probe 30 in block 58. A continuous monitor of whether tip 14 has contacted probe 30 is performed per block 60. If contact is sensed, the movement of ram 22 is stopped per block 66. If not, ram 22 is slowly moved further downwards until tip 14 of punch 8 is sensed by probe 30 in blocks 62 and 64. Once contact is made between tip 14 and probe 30, and after the movement of ram 22 has been stopped, probe 30 is pivoted to a non-contact position per block 68. Simultaneously therewith, or sometime thereafter, the distance that ram 22 has moved is equated, or correlated, as $\Delta L$ and recorded in the table in memory 34 of processor 28 per block 70. Thereafter, $\Delta L$ is incorporated into the driving signal from processor 28 so that the movement of ram 22, when driven by hydraulic drive 26, is moved an additional distance $\Delta L$ so that the wear of punch 8 is compensated for by the lengthened movement of ram 22. Alternatively, instead of moving ram 22 an additional distance $\Delta L$ each time it is driven by hydraulic drive 26, ram 22 may be offset a distance ΔL so that even though its stroke remains as was before, the thus offset distance ΔL would cause ram 22 to drive punch 8 the requisite distance to penetrate the worksheet and mate with die 20. These alternative steps are noted in block 72 of FIG. 4. Once the offset has been incorporated to the start position of ram 22, be it additional movement every time ram 22 is driven by hydraulic drive 26 or offsetting ram 22 the additional distance, the system awaits resumption of operation in block 74. If it is determined that operation may be resumed at this time, then the punch press resumes its operation per block 50. If it is determined that the system should not resume operating, then it is turned off.

Inasmuch as the present invention is subject to many variations, modifications, and changes in detail, it is intended that all matter described throughout this specification and shown in the accompanying drawings be interpreted as illustrative only and not in a limiting sense. Accordingly, it is intended that the invention be limited only by the spirit and scope of the herein appended claims.

I claim:

1. In a numerically controlled punch press having a punch, a ram for driving said punch, a die for mating with said punch to effect holes on a workpiece interposed between said punch and said die, an improvement for compensating wear of said punch, comprising:
   means for moving said ram;
   sensing means positioned relative to said punch and movable to a predetermined position along the line of movement of said punch to detect contact made with the work end of said punch as said punch is driven by said ram, said sensing means outputting a signal in consequence thereof;
   processor means receiving said signal from said sensing means and equating said signal with a distance said ram needs to be moved to drive said work end of said punch to said predetermined position, said processor means providing said distance thereafter to said moving means to move said ram to drive said punch.

2. The improvement of claim 1, wherein said sensing means comprises a touch probe.

3. The improvement of claim 1, wherein said processor means comprises:
   memory means for storing at least the length of a new one of said punch and a preset distance which said ram is to be moved when driving said new one of said punch to said predetermined position;
   wherein said processor means compares the distance equated from said signal with said preset distance to determine the wear of said punch; and
   wherein said processor means compensates the wear of said punch by correlating the distance to move said ram to drive said punch with the difference between said preset distance and said distance equated from said signal.

4. The improvement of claim 1, wherein said sensing means is positionable away from said punch and said die so that it does not obstruct the mating of said punch to said die for effecting holes on said worksheet.

5. The improvement of claim 1, wherein said predetermined position of said sensing means represents an offset to add to the movement of said ram to ensure that said punch will be driven to penetrate said workpiece.

6. In a numerically controlled turret punch press having a rotatable upper turret to which a plurality of punches are mounted and a rotatable lower turret, to which a plurality of dies are mounted, said turret punch press including a ram to drive at least one punch to a corresponding die each having been rotated in alignment with said ram for punching at least one hole on a worksheet interposed between said one punch and said one die, apparatus for driving said one punch a sufficient distance to penetrate said worksheet and mate with said die, comprising:
   sensing means positioned relative to said one punch and movable to a first position along the line of movement of said one punch to detect contact by the tip of said one punch:
   processor means working cooperatively with said sensing means to equate said contact with a distance said ram needs to be moved to drive the tip of said one punch to said first position;
   wherein said processor means thereafter adds said equated distance to the movement of said ram to drive said one punch.

7. Apparatus of claim 6, wherein said sensing means comprises a touch probe movable to a second position away from said one punch and one die.

8. Apparatus of claim 6, wherein said processor means comprises:
   memory means for storing at least the length of a new one of said one punch and a preset distance which said ram is to be moved when driving said new one of said one punch to said first position;
   wherein said processor means compares said equated distance with said preset distance to determine the wear of said one punch.

9. In a numerically controlled punch press having a punch, a ram for driving said punch, a die for mating with said punch to effect holes on a workpiece interposed between said punch and said die, a method of compensating wear on said punch comprising the steps:
   positioning sensing means relative to said punch;
   moving said sensing means to a predetermined position along the line of movement of said punch:
   detecting contact made by the work end of said punch, as said punch is driven by said ram, with said sensing means;
   outputting a signal when contact is made in said detecting step;
   equating said signal with a distance said ram needs to be moved to drive said work end of said punch to said predetermined position; and
   providing said equated distance as a feedback to move said ram to drive said punch.

10. The method of claim 9, further comprising the steps of:
    storing at least the length of a new one of said punch and a preset distance which said ram is to be moved when driving said new one of said punch to said predetermined position;
    comparing said equated distance with said preset distance to determine the wear of said punch; and
    compensating the wear of said punch by correlating the distance to move said ram with the difference between said preset distance and said equated distance.

11. The method of claim 9, further comprising the step of:
    moving said sensing means to another position to prevent the same from obstructing the movement of said punch.

12. In a numerically controlled turret punch press having a ratable upper turret to which a plurality of punches are mounted and a rotatable lower turret to which a plurality of dies are mounted, said turret punch press including a ram to drive at least one punch to a corresponding die for punching at least one hole on a worksheet, a method for driving said one punch a sufficient distance to penetrate said worksheet and mate with said one die, comprising the steps of:

rotating said upper turret to position said one punch in alignment with said ram;

rotating said lower turret to position said one die in alignment with said ram;

positioning sensing means relative to said one punch;

moving said sensing means to a first position along the line of movement of said one punch to detect contact by the tip of said punch;

equating said contact by said sensing means with a distance said ram needs to be moved to drive the tip of said one punch to said first position; and adding said equated distance to the movement of said ram to drive said one punch.

13. The method of claim 12, further comprising the steps of:

storing at least the length of a new one of said one punch and a preset distance which said rain is to be moved when driving said new one of said one punch to said first position; and comparing said equated distance with said preset distance to determine the wear of said one punch.

* * * * *